US008873462B2

(12) United States Patent
Pajukoski et al.

(10) Patent No.: US 8,873,462 B2
(45) Date of Patent: Oct. 28, 2014

(54) REDUCED COMPLEXITY RECEIVER FOR UL COMP

(75) Inventors: Kari P. Pajukoski, Oulu (FI); Kari J. Hooli, Oulu (FI); Esa T. Tiirola, Kempele (FI); Matti T. Kiiski, Oulunsalo (FI); Pasi Eino Tapio Kinnunen, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 375 days.

(21) Appl. No.: 13/110,270

(22) Filed: May 18, 2011

(65) Prior Publication Data

US 2012/0294162 A1 Nov. 22, 2012

(51) Int. Cl.
| | | |
|---|---|---|
| *H04W 4/00* | (2009.01) | |
| *H04B 7/08* | (2006.01) | |
| *H04B 7/02* | (2006.01) | |
| *H04B 7/06* | (2006.01) | |
| *H04W 72/08* | (2009.01) | |

(52) U.S. Cl.
CPC .............. *H04B 7/024* (2013.01); *H04B 7/0874* (2013.01); *H04W 72/082* (2013.01); *H04B 7/0854* (2013.01); *H04B 7/068* (2013.01)
USPC ........... 370/328; 370/331; 370/338; 455/436; 455/450

(58) Field of Classification Search
USPC .......... 370/201, 252, 328, 331, 338; 455/450, 455/452.1, 464
See application file for complete search history.

(56) References Cited

U.S. PATENT DOCUMENTS

| 6,289,221 | B1* | 9/2001 | Ritter ............................ 455/447 |
| 7,688,779 | B2* | 3/2010 | Cromer et al. ............... 370/328 |
| 8,284,721 | B2* | 10/2012 | Chen et al. .................... 370/329 |
| 2005/0181799 | A1* | 8/2005 | Laroia et al. .................. 455/450 |
| 2009/0017829 | A1* | 1/2009 | Laroia et al. .................. 455/446 |

FOREIGN PATENT DOCUMENTS

WO  WO-2011/109544 A1  9/2011

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.3.0, Mar. 2011, 197 pgs.

(Continued)

*Primary Examiner* — Dady Chery
(74) *Attorney, Agent, or Firm* — Harrington & Smith

(57) ABSTRACT

Methods, apparatus and computer program products are disclosed. A method includes receiving signals from a number of antennas, the signals from a number of user equipments and comprising a number of sub-bands allocated to the number of user equipments; selecting, based on one or more criteria and for each of number of selected sub-bands allocated to a selected one of the number of user equipments, one or more antennas of the number of antennas to be used for signal detection and interference suppression on the received signals for the selected user equipment; and performing, for the selected user equipment, the signal detection and interference suppression on the received signals for each of the number of selected sub-bands based on the corresponding selected one or more antennas for each of the number of selected sub-bands to create an output signal.

20 Claims, 8 Drawing Sheets

(56) References Cited

OTHER PUBLICATIONS

"3rd Generation Partnership Project; Technical Specification Group Radio Access Network; Feasibility study for Further Advancements for E-UTRA (LTE-Advanced) (Release 9)", 3GPP TR 36.912 V9.3.0, Jun. 2010, 61 pgs.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.

Grant, S., et al.; "Uplink CoMP for HSPA"; IEEE 73rd Vehicular Technology Conference (VTC Spring); May 15-18, 2011; pp. 1-5.

3GPP TSG-RAN WG1 #56; "UL CoMP Scheme and System Level Performance Evaluation"; Feb. 9-13, 2009; whole document (11 pages); R1-090923, Sections 2-2, 8.2; Athens, Greece.

Zheng, N., et al.; "Uplink Coordinated Multi-Point for LTE-A in the Form of Macro-Scopic Combining"; IEEE 71st Vehicular Technology Conference (VTC 2010-Spring); May 16-19, 2010; pp. 1, 5.

Marsch, P., et al.; "A Framework for Optimizing the Uplink Performance of Distributed Antenna Systems under a Constrained Backhaul"; IEEE International Conference on Communications; Jun. 24-28, 2007; pp. 975, 979.

3GPP TSG RAN WG1 Meeting #57; "Uplink DM RS from CoMP viewpoint"; May 4-8, 2009; whole document (4 pages); San Francisco, CA, USA.

3GPP TSG RAN WG1 meeting #56bis; "Considerations on the Uplink Reference Signal for CoMP"; Mar. 23-27, 2009; whole document (4 pages); R1-091267; Seoul, Korea.

3GPP TSG RAN WG1 Meeting #65; "UL CoMP performance w/o inter-cell orthogonl reference signal"; May 9-13, 2011; whole document (3 pages); R1-111739; Barcelona, Spain.

\* cited by examiner

__US 8,873,462 B2__

REDUCED COMPLEXITY RECEIVER FOR UL COMP

TECHNICAL FIELD

This invention relates generally to radio frequency communications and, more specifically, relates to receivers of uplink (UL) coordinated multipoint (CoMP) communications.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
BS base station
BW bandwidth
CA carrier aggregation
CC component carrier
CoMP coordinated multi-point (transmission or reception)
CRS cell-specific reference symbols
CSI channel state information
CSI-RS channel state information reference symbols
DCI downlink control information
DFT discrete Fourier transform
DL downlink (from the network to a UE)
DM RS demodulation reference signal
eNB, eNodeB EUTRAN Node B (evolved Node B/base station)
EPC evolved packet core
EUTRAN evolved universal terrestrial access network
MAC medium access control (layer 2, L2)
MIMO multiple input multiple output
MM/MME mobility management/mobility management entity
OFDMA orthogonal frequency division multiple access
PDCCH physical downlink control channel
PDCP packet data convergence protocol
PDSCH physical downlink shared channel
PHY physical (layer 1, L1)
PL pathloss
PMI precoding matrix indicator
PRB physical resource block
PUSCH physical uplink shared channel
RLC radio link control
RRC radio resource control
RRH remote radio head
RS reference symbol
RSRP reference symbol received power
RSRP reference symbol received quality
Rx or RX reception or receiver
SC-FDMA single carrier-frequency division multiple access
SGW, SG-W serving gateway
SRS sounding reference symbols
TPC transmit power control
Tx or TX transmission or transmitter
UE user equipment (e.g. mobile terminal)
UL uplink (from a UE to the network
UPE user plane entity One modern communication system is known as evolved UTRAN (E-UTRAN, also referred to as UTRAN-LTE or as E-UTRA). FIG. 1 reproduces FIG. 4-1 of 3GPP TS 36.300 and shows an overall architecture of the EUTRAN system. The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW). The S1 interface supports a many-to-many relationship between MMEs/S-GWs/UPEs and eNBs. In this system, the DL access technique is OFDMA, and the UL access technique is SC-FDMA. The EUTRAN system shown in FIG. 1 is one possible system in which the exemplary embodiments of the instant invention might be used.

Of particular interest herein are the further releases of 3GPP LTE (e.g., LTE Rel-10, LTE Rel-11) targeted towards future IMT-A systems, referred to herein for convenience simply as LTE-Advanced (LTE-A). LTE-A is specified in Rel-10 (see, e.g., 3GPP TS 36.300 v10.3.0 (2011-03)), further enhancements in Rel-11. Reference in this regard may also be made to 3GPP TR 36.913 V9.0.0 (2009-12) Technical Report 3rd Generation Partnership Project; Technical Specification Group Radio Access Network; Requirements for further advancements for Evolved Universal Terrestrial Radio Access (E-UTRA) (LTE-Advanced)(Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

Coordinated multi-point (CoMP) reception is considered for LTE-A as a tool to improve the coverage of high data rates. In this type of system, multiple geographically separated points and antenna(s) at these points receive signals from multiple user equipments. The signals then need to be combined in order to determine data from the user equipments. Typical techniques for combining these signals can be too complex.

SUMMARY

The following summary is merely intended to be exemplary. The summary is not intended to limit the scope of the claims.

An exemplary method includes receiving signals from a number of antennas, the signals from a number of user equipments and comprising a number of sub-bands allocated to the number of user equipments; selecting, based on one or more criteria and for each of number of selected sub-bands allocated to a selected one of the number of user equipments, one or more antennas of the number of antennas to be used for signal detection and interference suppression on the received signals for the selected user equipment; and performing, for the selected user equipment, the signal detection and interference suppression on the received signals for each of the number of selected sub-bands based on the corresponding selected one or more antennas for each of the number of selected sub-bands to create an output signal.

In another exemplary embodiment, an apparatus is disclosed that includes one or more processors and one or more memories including computer program code. The one or more memories and the computer program code are configured to, with the one or more processors, cause the apparatus to perform at least the following: receiving signals from a number of antennas, the signals from a number of user equipments and comprising a number of sub-bands allocated to the number of user equipments; selecting, based on one or more criteria and for each of number of selected sub-bands allocated to a selected one of the number of user equipments, one or more antennas of the number of antennas to be used for signal detection and interference suppression on the received signals for the selected user equipment; and performing, for the selected user equipment, the signal detection and interference suppression on the received signals for each of the number of selected sub-bands based on the corresponding selected one or more antennas for each of the number of selected sub-bands to create an output signal.

In an additional exemplary embodiment, a computer program product is disclosed that includes a computer-readable storage device bearing computer program code embodied therein for use with a computer, the computer program code including: code for receiving signals from a number of antennas, the signals from a number of user equipments and comprising a number of sub-bands allocated to the number of user equipments; code for selecting, based on one or more criteria and for each of number of selected sub-bands allocated to a selected one of the number of user equipments, one or more antennas of the number of antennas to be used for signal detection and interference suppression on the received signals for the selected user equipment; and code for performing, for the selected user equipment, the signal detection and interference suppression on the received signals for each of the number of selected sub-bands based on the corresponding selected one or more antennas for each of the number of selected sub-bands to create an output signal.

DETAILED DESCRIPTION OF THE DRAWINGS

Figure 2:
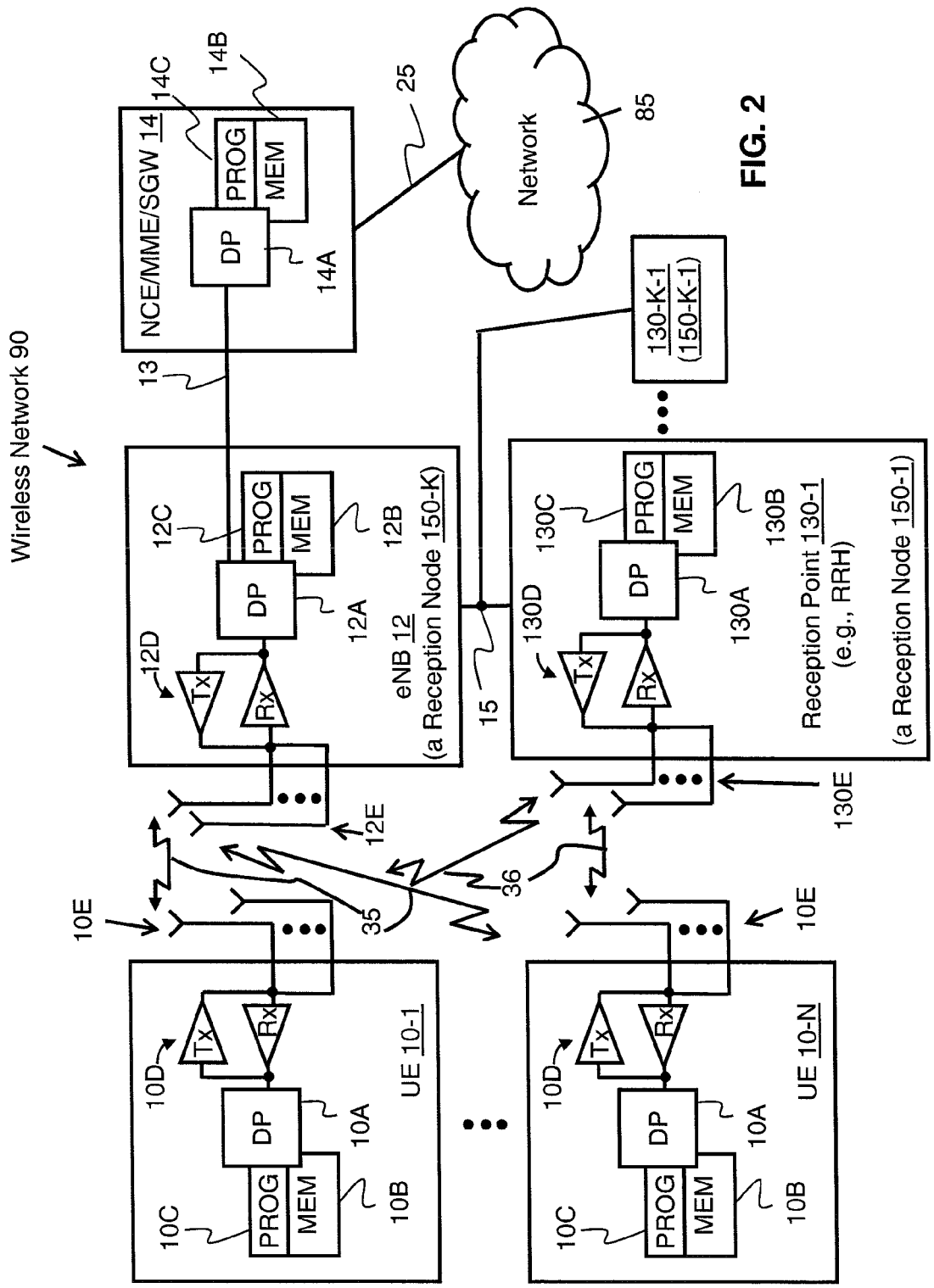
FIG. 2 shows a simplified block diagram of various electronic devices that are suitable for use in practicing the exemplary embodiments of this invention.

Before describing the exemplary embodiments of this invention, reference is made to FIG. 2 for illustrating a simplified block diagram of various apparatus that are suitable for use in practicing the exemplary embodiments of this invention. In FIG. 2, a wireless network 90 includes an eNB 12, an NCE/MME/SGW 14, and K-1 reception points 130, shown as RRHs 130. The wireless network 90 is adapted for communication over wireless links 35, 36 with apparatus 10-1 through 10-N, such as mobile communication devices which may be referred to as UEs 10, via a network access node, such as a Node B (base station), and more specifically an eNB 12 and via the RRHs 130. The network 90 may include a network control element (NCE) 14 that may include MME/SGW functionality, and which provides connectivity with a further network, such as a telephone network and/or a data communications network 85 (e.g., the internet) through link 25. The NCE 14 includes a controller, such as at least one data processor (DP) 14A, and at least one computer-readable memory medium embodied as a memory (MEM) 14B that stores a program of computer instructions (PROG) 10C.

The UEs 10-1 through 10-N include a controller, such as at least one data processor (DP) 10A, at least one computer-readable memory medium embodied as a memory (MEM) 10B that stores a program of computer instructions (PROG) 10C, and at least one suitable radio frequency (RF) transceiver 10D for bidirectional wireless communications with the eNB 12 and the RRHs 130 via one or more antennas 10E (and each UE 10 may have differing numbers of antennas 10E, DPs 10A, memories 10B, and even transceivers 10D).

Figure 1:
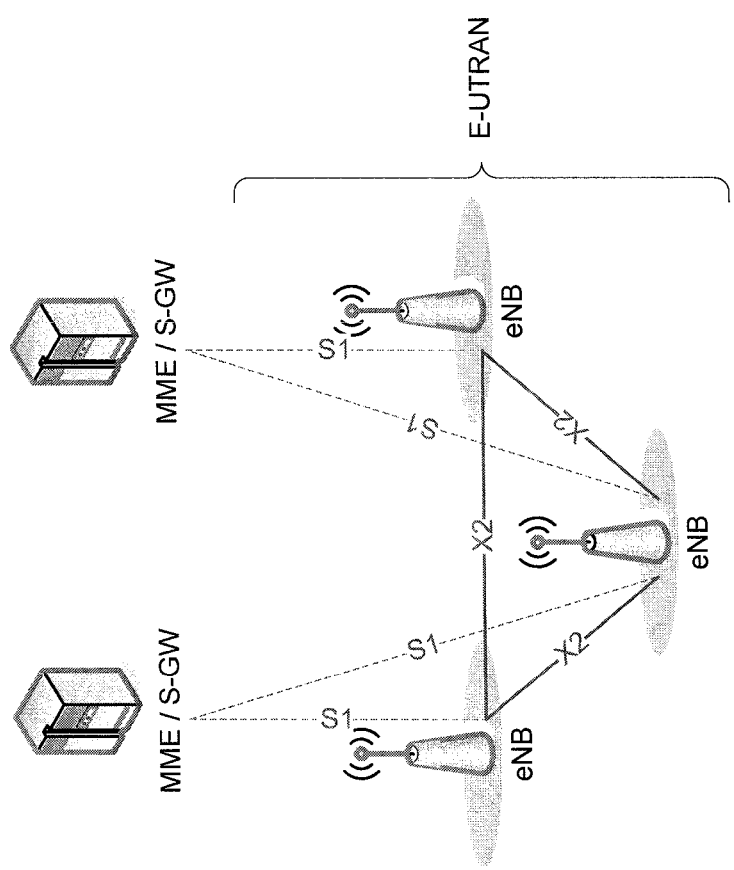
FIG. 1 reproduces FIG. 4-1 of 3GPP TS 36.300 and shows the overall architecture of the EUTRAN system (Rel-8).

The eNB 12 also includes a controller, such as at least data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas 12E (typically several when multiple input, multiple output (MIMO) operation is in use). The eNB 12 is coupled via a data and control path 13 to the NCE 14. The path 13 may be implemented as an S1 interface, as shown in FIG. 1. The eNB 12 may also be coupled to reception points 130 via data and control path 15, which may be implemented as an X2 interface in case of another logical base station or can be a direct eNodeB internal interface, e.g., optical fiber connection, to connect some reception points 130 such as RRHs to the eNB 12. Typically, the eNB 12 covers a single macro cell (shown in FIG. 3) via the one or more antennas 12E and the reception points cover other cells within the single macro cell.

Figure 3:
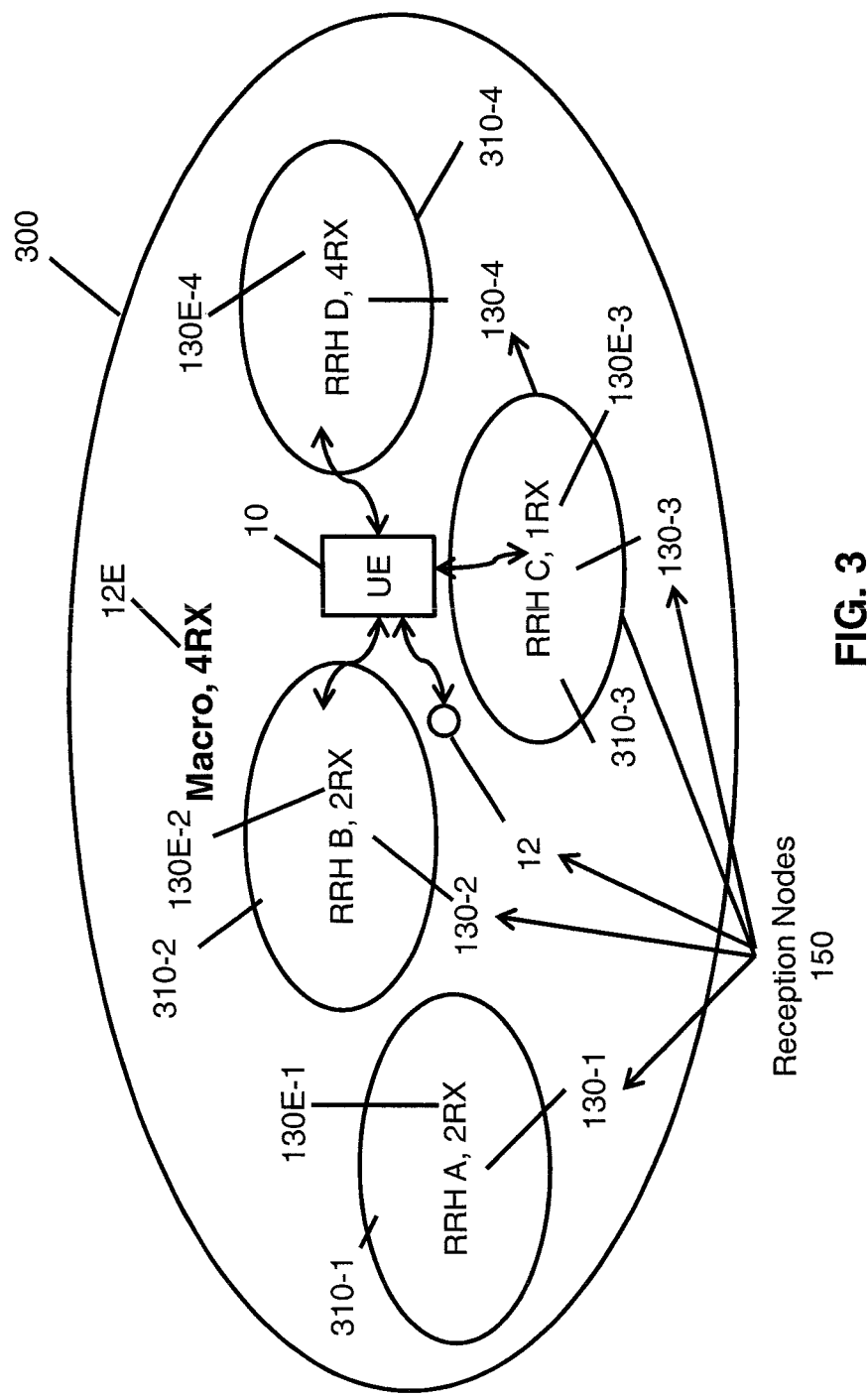
FIG. 3 is an example of a macro cell having multiple reception nodes within the macro cell.

In this example, the reception point 130 includes a controller, such as at least one data processor (DP) 130A, at least one computer-readable memory medium embodied as a memory (MEM) 130B that stores a program of computer instructions (PROG) 130C, and at least one suitable RF transceiver 130D for communication with the UE 10 via one or more antennas 130E (as stated above, typically several when MIMO operation is in use). The reception points 130 communicate with the UE 10 via a link 36. The reception points 130 may communicate, depending on implementation, with the eNB 12 using a data and control path 15. The reception point 130 can be another eNodeB or can be logically be part of eNB 12 as, e.g., enabled by an RRH and covers some local hotspot coverage 310 inside the macro cell coverage area (as shown in FIG. 3). For single-cell MIMO, all of the reception points 130 (see also FIG. 3) are under complete control of a single eNB 12. Thus, there is centrally some unit where several reception points/RRHs 130 are connected as such. The idea is that the reception points 130 and the macro eNB 12 are centrally controlled together. The control is typically at the location of the macro eNB 12, but could also be at a location that is connected to the eNB 12 and the reception points 130.

In one exemplary scenario, the eNB 12 may receive information from UEs 10, as can each of the reception points 130. For this reason (as shown in FIG. 2), each of the eNB 12 and the receptions points 130 is considered to be a reception node 150 herein. In the example of FIG. 2, there are K reception nodes 150 including the eNB 12. In another exemplary scenario, the eNB 12 may be limited to control functions and the reception nodes would not include the eNB 12. In this case, the eNB 12 could have, e.g., an RRH 130 located geographically at the location of the eNB 12 and would use that RRH for reception/transmission and there would be K RRHs 130, each of which is a reception node 150.

At least one of the PROGs 10C, 12C, and 130C is assumed to include program instructions that, when executed by the associated DP, enable the corresponding apparatus to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, and/or by the DP 130A of the reception point, or by hardware (e.g., an integrated circuit configured to perform one or more of the operations described herein), or by a combination of software and hardware (and firmware).

In general, the various embodiments of the UE 10 can include, but are not limited to, cellular telephones, tablets having wireless capability, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B, 12B, and 130B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A, and 130A may be of any type suitable to the local technical environment, and may include one or more of general purpose computers, special purpose computers, microprocessors, digital signal processors (DSPs) and processors based on multi-core processor architectures, as non-limiting examples.

One example of a CoMP deployment scenario of interest in this case is depicted in FIG. 3. Within the coverage area 300 of one macro eNodeB 12 with, e.g., 4 (four) TX antennas 12E, there are altogether four hotspots 310-1 through 310-4 covered by four reception points (e.g., RRHs) 130-1 through 130-4, each having some reception antennas 130E-1 through 130-4, respectively. In the example of FIG. 3, the UE 10 can transmit to the RRHs 130-2, 130-3, and 130-4 and the eNB 12.

Figure 4:
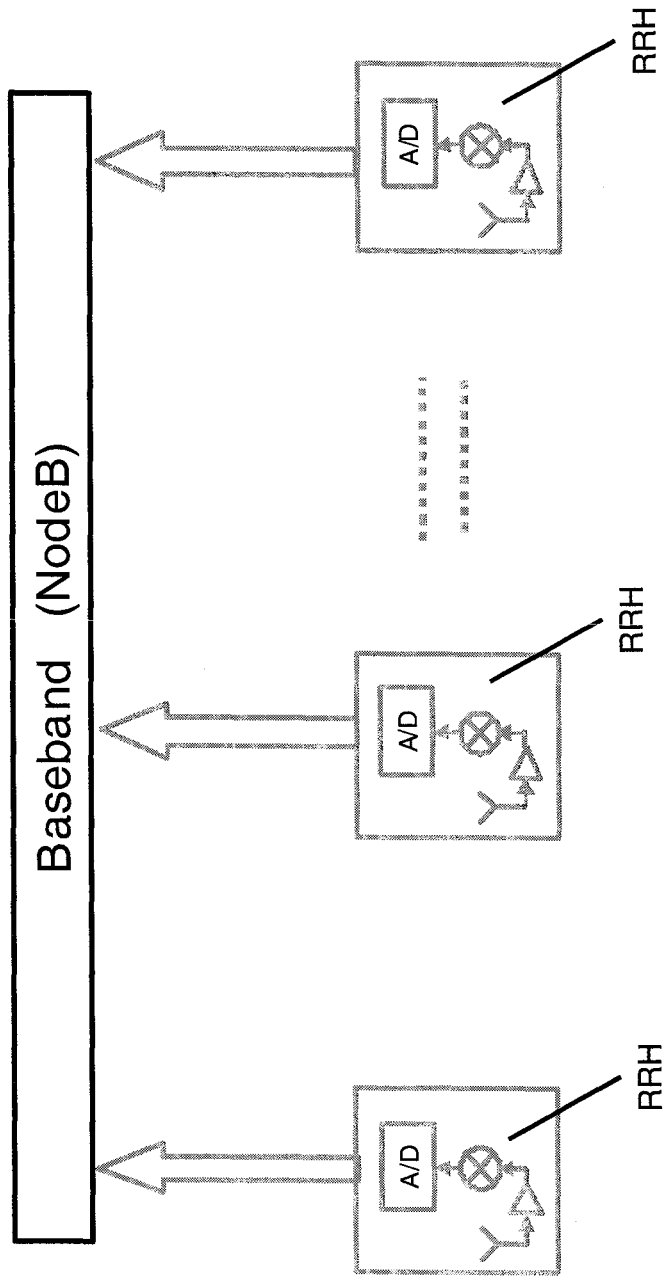
FIG. 4 is a block diagram of a portion of a multipoint reception system with multiple reception nodes, in a general example to illustrate possible techniques for performing reception.

Now that exemplary apparatus have been described, additional detail about the exemplary embodiments is provided. The instant invention relates, in an exemplary embodiment, to the LTE-Advanced (LTE-A) system. More specifically, focus is placed herein on the uplink (UL) receiver structure in the case of CoMP (coordinated multi-point) reception. CoMP reception is considered for LTE-Ad as a tool to improve the coverage of high data rates and to increase system throughput. Uplink CoMP implies reception of the transmitted signal at multiple, geographically separated points (e.g., reception nodes 150). The reception points can be, in an exemplary embodiment, RRHs connected to one baseband unit in an eNodeB. See FIG. 4. Each RRH may include antennas 130E, RF circuitry plus analog-to-digital converters and down converters.

One main option for CoMP reception is to detect desired signals jointly over multiple RRHs 130 and, in particular, perform equalization/spatial processing jointly over signals from multiple RRHs 130. This reception options yields the best performance. However, when the number of RRHs 130 increases, the baseband complexity will be a problem and potentially the limiting factor for system performance.

The simplest and most typical receiver would implement interference rejection combining (IRC), in which the receiver equipped with multiple antennas and RRHs would estimate the interference covariance matrix and, based on that estimate, compute a proper weighting for the receiver antennas and RRHs in order to spatially suppress interference. The most critical part in terms of complexity is the matrix inversion needed in the calculation for optimal weighting between RRHs and antenna signals. The complexity of matrix inversion essentially depends on the third power of matrix size. In the case of multipoint reception, matrix size is given by the number of RRHs multiplied by the number of antennas per RRH. Thus, with increasing number of RRHs, the matrix size grows quickly and the upper limit for practically feasible complexity of matrix inversion is reached and exceeded quickly.

In addition to IRC, also other potential receiver options performing equalization or spatial processing jointly over multiple RRHs involves covariance matrix inversion and, thus, face the same computational complexity problem.

One possible solution to the increasing complexity would be to limit the number of RRHs used for detection based on received signal strength at each of the RRHs. This approach ameliorates the problem of computational complexity by fixing the matrix size to a predetermined value (or less). However, this solution provides reduced performance relative to not limiting the size of the matrix.

By contrast, the exemplary embodiments of the instant invention provide RRH (or Rx antenna) selection techniques targeting a maximized cost function between receiver complexity (e.g., cost) and performance. The invention can be used for both linear interference rejection receivers and non-linear interference cancellation receivers with collaborated reception. In an exemplary embodiment, RRHs or Rx antennas used for signal detection and interference suppression are selected separately for each PRB and UE. The selection of RRHs/Rx antennas per PRB and UE may be based on channel estimates. The channel estimates for each PRB and UE may be performed advantageously in pre-receiver circuitry.

Figure 5:
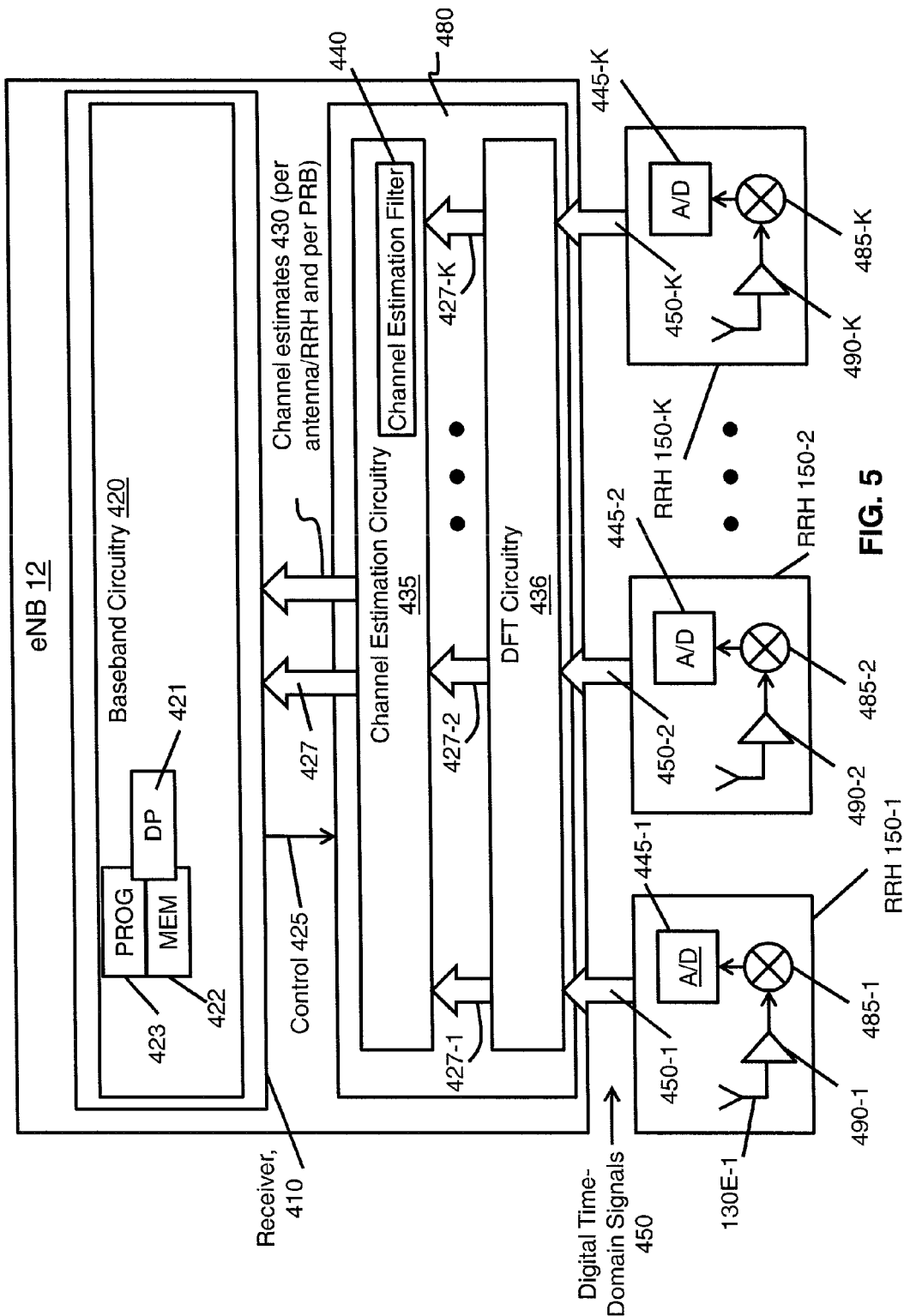
FIG. 5 is a block diagram of a portion of a multipoint reception system with multiple reception nodes, in accordance with exemplary embodiments of the instant invention.

FIG. 5 is a block diagram of a portion of a multipoint reception system with multiple reception nodes, in accordance with exemplary embodiments of the instant invention. The eNB 12 communicates with K RRHs 150, which receive signals from UEs as shown in FIG. 2 (although, as noted above, the eNB 12 might also receive from UEs). Each of the RRHs 150 in this example includes an analog to digital (A/D) converter 445, antenna(s) 130E, a power amplifier 490, and a down converter 485. This is merely exemplary and the RRHs may have other configurations. For instance, the down converters 485 could come after the A/D converters 445 in the signal path (i.e., instead of before the A/D converters 445 as shown in FIG. 5). Each of the RRHs 150 communicate digital time domain signals 450 (i.e., 450-1 through 450-K) to pre-receiver circuitry 480 (in an example) of the eNB 12, which communicates with a receiver 410 of the eNB 12. The pre-receiver circuitry and receiver 410 are part of the transceiver 12D shown in FIG. 1.

In an exemplary embodiment, pre-receiver circuitry 480 includes DFT (discrete Fourier transform) circuitry 436, which operates on the digital time domain signals 450 to create K digital frequency domain signals 427. The pre-receiver circuitry 480 also includes channel estimation circuitry 435, which operates on the digital frequency domain signals 427 to create channel estimates 430 per antenna/RRH and per PRB. The channel estimate circuitry also may include a channel estimation filter 440. The channel estimation filter 440 performs filtering that reduces the effect of noise. It is also noted that, typically, channel estimation is performed from several samples of the received signal. It is noted that the digital frequency domain signals 427 are supplied to the baseband circuitry 420, either by passing through the channel estimation circuitry 435 (as shown in the example of FIG. 5) or by directly passing from the DFT circuitry 436 to the baseband circuitry 420. The pre-receiver circuitry 480 may also be incorporated into the baseband circuitry 420. However, having the items in pre-receiver circuitry 480 outside of the baseband is one beneficial implementation in the sense that these can implemented in separate hardware and therefore not add to baseband circuitry requirements.

The baseband circuitry 420 comprises a data processor (DP) 421, a memory (MEM) 422, and a program (PROG) 423 of computer instructions. The memory 422 and program 423 are configured, along with the data processor 421, to cause the baseband circuitry 420 to perform operations on data received from the channel estimation circuitry 435 (and the digital frequency domain signals 427). The memory 422 and program 423 are typically also configured, along with the data processor 421, to cause (e.g., configure) the pre-receiver circuitry 480 to perform its actions. It is also noted that the DP 12A, MEM 12B, and PROG 12C may also configure the baseband circuitry 420 (and possibly the pre-receiver circuitry 480) to carry out its (their) respective actions.

The control sign(s) 425 are used in an exemplary embodiment to allow the receiver 410 to inform the pre-receiver circuitry 480 of pre-selected RRHs/RX antennas. That is, the receiver 410 may perform pre-selection of RRHs/Rx antennas prior to when the pre-receiver circuitry 480 performs its actions such as channel estimation. Pre-selection of RRHs/RX antennas should reduce the complexity of channel selection made in the pre-receiver circuitry 480. For instance, the receiver 410 can reduce the number of performed channel estimates based on, e.g., long term knowledge of received signal strengths. That is, the channel estimates per UE are not performed for each PRB and RRH/RX antenna and are, instead, performed for the RRH/RX antennas as indicated by the control signal(s) 425.

Figure 6:
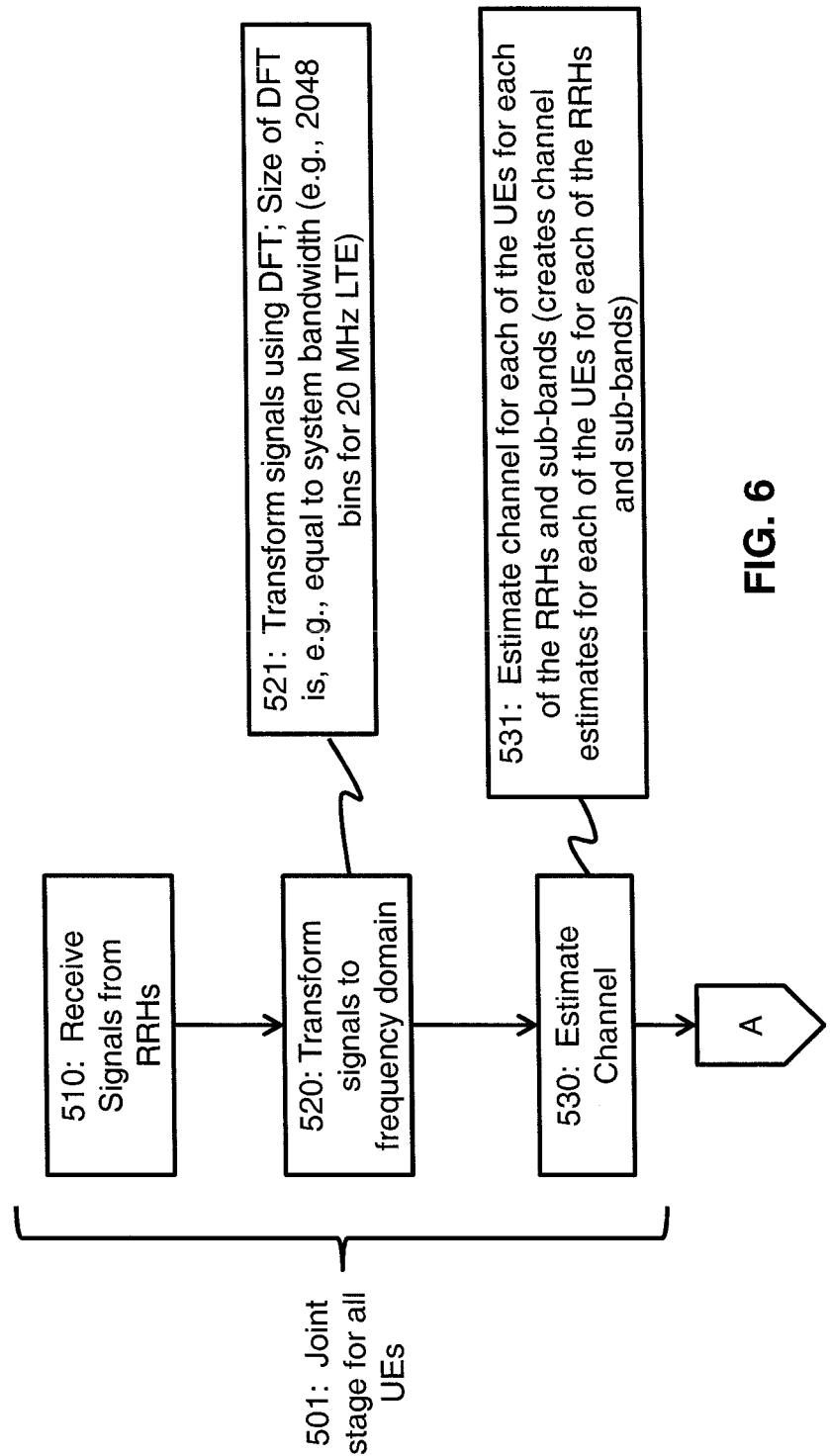
FIG. 6 shows an exemplary block diagram of a method performed by, or of operations performed by circuitry of, a base station for linear interference rejection.
Figure 6:
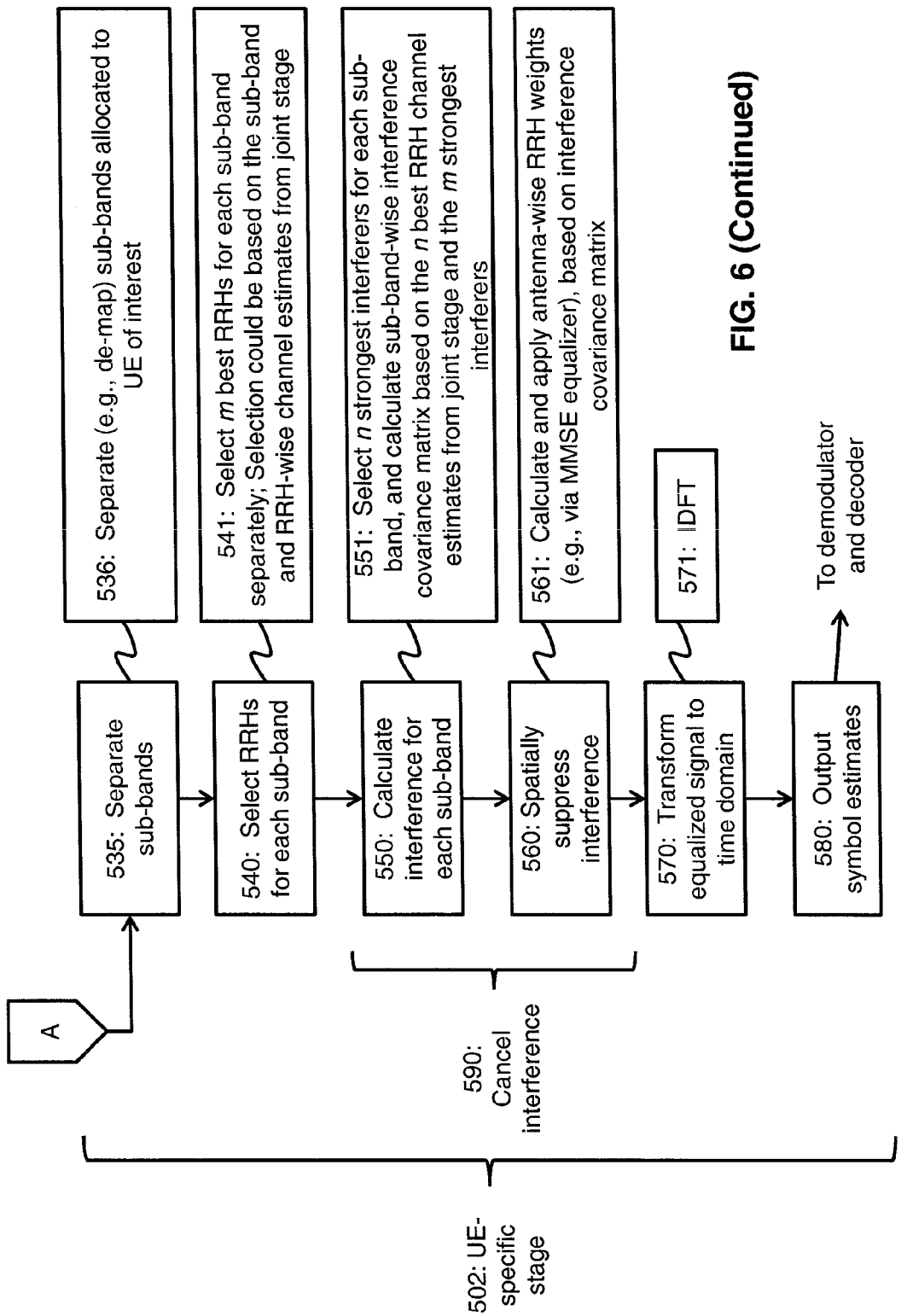

FIG. 6 shows an exemplary block diagram of a method performed by, or of operations performed by circuitry of, a base station such as eNB 12 for linear interference rejection. The block diagram in FIG. 6 is divided into two stages, a joint stage 510 for all UEs, and a UE-specific stage 502 for a single selected UE. This means that data from multiple UEs could be operated on by performing the UE-specific stage multiple times for each of the UEs. The joint stage, in the example of FIG. 5 above, is performed by the pre-receiver circuitry 480, while the UE-specific stage is performed by the receiver 410 and more particularly the baseband circuitry 420 (e.g., by the data processor 421).

Blocks 510-530 are examples of the joint stage 501. In block 510, signals are received from the K RRHs 130 (as shown in FIG. 5). The signals are assumed to be digital (see the digital time domain signals 450 in FIG. 5). In block 520, the signals are transformed to the frequency domain. In an example (see block 520), the signals are transformed using a DFT (discrete Fourier transform). In the example of FIG. 5, DFT circuitry 436 performs this operation and creates the digital frequency domain signals 427. The size of DFT is, e.g., equal to system bandwidth (e.g., 2048 bins for 20 MHz LTE) for each of the time domain signals 450. In block 520, an estimation of the channel is performed. An example of block 520 is shown in block 531, where a channel estimate is made for each of the UEs for each of the RRHs and sub-bands. This results in channel estimates (e.g., channel estimates 430) for each of the UEs for each of the RRHs and sub-bands. In the example of FIG. 5, the channel estimation circuitry 435 performs this operation.

Blocks 535-580 are part of the UE-specific stage 502. In block 535, the receiver 410 separates the sub-bands. The operation in block 535 is performed in an example by the baseband circuitry 420 under direction of or by the data processor 421. For ease of reference, the receiver 410 will mainly be used in the following description. An example of this is separating (e.g., de-mapping) sub-bands allocated to the UE of interest (block 536). It is noted that the sub-bands allocated to the UE of interest can span one or more physical resource blocks (PRBs) (e.g., there could be some sub-bands in one PRB and additional sub-bands in another PRB). In block 540, the receiver 410 selects the RRHs for each sub-band. It is noted that in this block the receiver 410 could select the Rx antennas for each sub-band. Block 541 shows an example of block 540, where the receiver 410 selects m best RRHs for each sub-band separately. The selection could be based on the sub-band and RRH-wise channel estimates 430 from the joint stage 501 (although other options are described below). The best RRH/antennas are selected based on criteria such as higher received signal strength and/or lower interference strength. Both interference power and received power can be estimated from, e.g., channel estimates 430. It is noted that an example of m would be 2-8, depending on the capability of the baseband circuitry 420, and these values of m are typical but not limiting.

Block 550 and 560 are an example of performing interference rejection. In block 550, the receiver 410 calculates interference for each sub-band. An example is shown in block 551, where the receiver selects the n strongest interferers for each sub-band and calculates sub-band-wise interference covariance matrix based on the channel estimates from joint stage. The selection criteria could be, e.g., signal strength or signal-to-interference ratio (as described above in reference to block 541). It is noted there could be m RRHs selected in block 541 and n interferers selected in block 551, and m may or may not be equal to n. Generally, in a linear receiver, m should be larger than n. With a non-linear receiver, this limit need not be met (i.e., n could be larger than m). In block 560, the receiver 410 spatially suppresses the interference. In the example of block 561, the receiver calculates and applies antenna-wise RRH weights (e.g., via an MMSE equalizer). The antenna-wise RRH weights are applied to the frequency domain signal from block 520. In block 570, the receiver 410 transforms the equalized signal to the time domain, e.g., via an IDFT (block 571). In block 580, the receiver outputs symbol estimates to, e.g., a demodulator and decoder.

Figure 7:
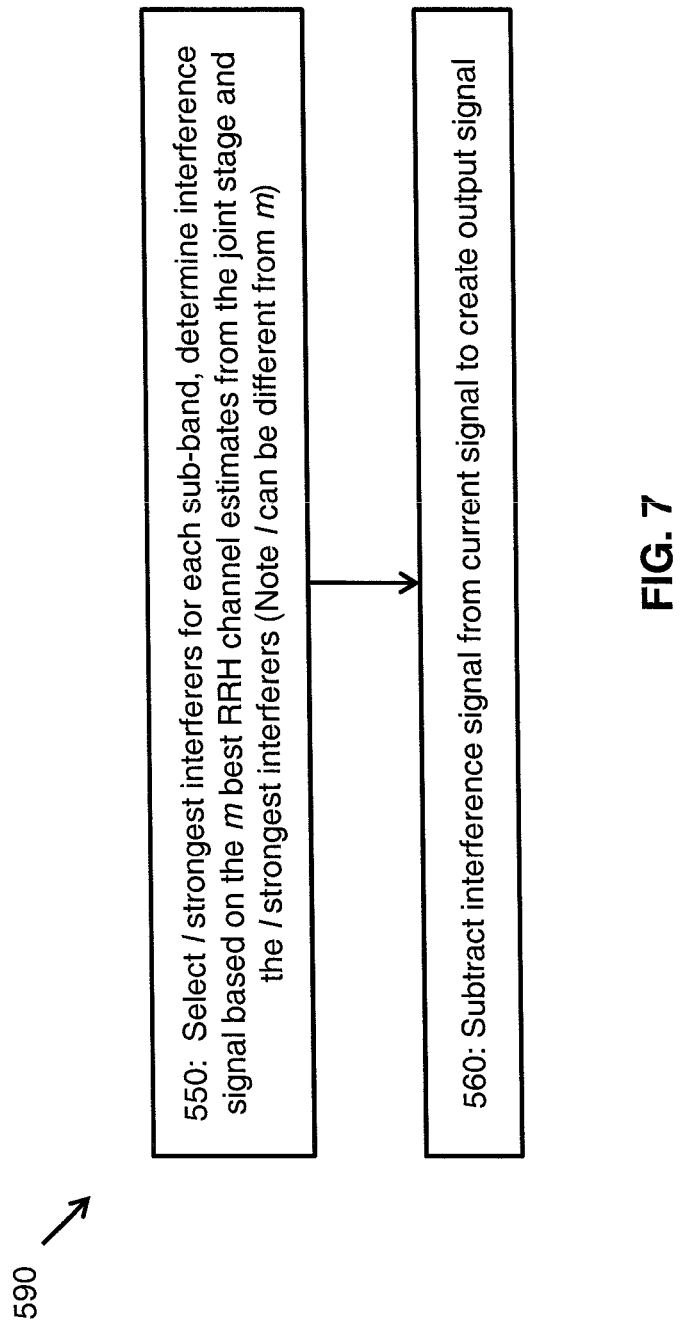
FIG. 7 shows a block diagram of a flowchart for a block performed in FIG. 6.

The interference cancellation stage (block 590) can replace or follow the interference rejection stage. In the simplest case, that is, interference cancellation (block 590) can follow the same flowchart with the difference that in blocks 550 and 560, cancellation is performed (as per FIG. 7) instead of antenna weighting. This is shown in FIG. 7, where in block 550, the l strongest interferers are selected for each sub-band, and an interference signal is determined based on the m best RRH channel estimates from the joint stage 501 and the l strongest interferers. It should be noted (as described above) that l can be different from, and larger than, m. In block 560, the interference signal determined in block 550 is subtracted from the current signal (e.g., the frequency domain signal from the output of block 520). It is noted that more complex scenarios can combine interference rejection and interference cancellation.

The maximum size of PRB-wise interference covariance matrix (see block 551) and, thus, antenna weights can be dimensioned to a predetermined number, e.g., four. This means that joint multi-point reception can be performed with baseband complexity similar to conventional single-point reception.

The differences to a typical antenna selection scheme are evident when UE transmissions can be received with comparable strength on more Rx antennas than the predetermined maximum size of the covariance matrix. When UE transmission bandwidth (BW) is large compared to the channel coherence BW, the channel properties obviously vary over the transmission BW. However, some of the Rx antennas need to be selected in the conventional approach, based on average channel properties over the BW. In exemplary embodiments of the instant invention, Rx antenna selection is performed per PRB, thus providing an additional degree of freedom in selection.

Various criteria can be used for Rx antenna selection. For instance, selection can be based on the signal strength, thus, providing frequency domain antenna selection diversity. As another example, selection can be based on estimated interference or orthogonality between terminals detected simultaneously in a CoMP area. In the example of FIG. 3, such a CoMP area for UE 10 could include the eNB 12 and its antennas 12E, and the RRHs 130-2, 130-3, and 130-4 and their antennas 130E-2, 130E-3, and 130E-4.

Some further notes on implementation:
Channel estimation may be performed in pre-receiver circuitry 480, and a channel estimation filter 440 can extend over multiple PRBs (and even multiple subframes), taking full advantage of channel coherence in frequency (and time).

The receiver 410 may perform pre-selection of RRHs/Rx antennas prior to the pre-receiver circuitry 480 to reduce the complexity of channel selection made in the pre-receiver circuitry.

Estimation of interference covariance matrix should be performed per PRB in any case due to PRB-wise resource allocation granularity in LTE.

Embodiments of the present invention may be implemented in software (executed by one or more processors), hardware, or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted, e.g., in FIG. 2 and FIG. 5. A computer-readable medium may comprise a computer-readable storage medium (e.g., device) that may be any media or means that can contain or store the instructions for use by or in connection with a system, apparatus, or device, such as a computer.

It is noted that any of the operations described above may be performed by a means for performing one of the operations. For example, an apparatus could comprise means for receiving signals from a plurality of antennas, the signals from a plurality of user equipments and comprising a plurality of sub-bands allocated to the plurality of user equipments; means for selecting, based on one or more criteria and for each of the plurality of selected sub-bands allocated to a selected one of the plurality of user equipments, one or more antennas of the plurality of antennas to be used for signal detection and interference suppression on the received signals for the selected user equipment; and means for performing, for the selected user equipment, the signal detection and interference suppression on the received signals for each of the plurality of selected sub-bands based on the corresponding selected one or more antennas for each of the plurality of selected sub-bands to create an output signal.

The apparatus of paragraph 0052, wherein: the apparatus further comprises means for estimating channels for the selected user equipment based on each of the plurality of antennas and each of the plurality of selected sub-bands; and the one or more criteria comprise the estimated channels for each of the plurality of antennas and for each of the plurality of selected sub-bands.

The apparatus of paragraph 0053, wherein: the one or more criteria comprise signal strength, determined using the estimated channels, for each of the antennas and each of the plurality of selected sub-bands.

The apparatus of paragraph 0053, wherein: the one or more criteria comprise one or both of estimated interference or orthogonality between user equipments including the selected user equipment detected in a coordinated multipoint area comprising the plurality of antennas, the one or both of estimated interference or orthogonality determined using the estimated channels and for each of the plurality of antennas and each of the plurality of selected sub-bands.

The apparatus of any one of paragraphs 0053 to 0055, wherein performing the signal detection and interference suppression further comprises: calculating interference for each of the plurality of selected sub-bands; and spatially suppressing the interference based on antenna weights calculated from the calculated interference and corresponding to the selected one or more antennas for each of the plurality of selected subbands.

The apparatus of paragraph 0056, wherein: selecting selects m antennas per sub-band based on the one or more criteria, wherein m is less than all of the plurality of antennas; calculating interference further comprises selecting n interferers per selected sub-band, and calculating sub-band-wise interference based on channel estimates corresponding to the m antennas and based on the n strongest interferers; and spatially suppressing interference further comprises, using the calculated sub-band-wise interference, calculating and applying antenna-wise weights to the received signals.

The apparatus of any one of paragraphs 0053 to 0055, wherein: selecting selects m antennas per sub-band based on the one or more criteria, wherein m is less than all of the plurality of antennas; performing the signal detection and interference suppression further comprises: calculating interference comprises selecting n interferers per selected subband, and further comprises determining an interference signal based on channel estimates corresponding to the m antennas and based on the l strongest interferers; and subtracting the interference signal from the plurality of received signals to create the output signal.

The apparatus of paragraph 0052, wherein: each of the plurality of antennas is attached to an individual one of a plurality of reception nodes, and each of the plurality of reception nodes comprises one or more of the plurality of antennas; and at least one of the plurality of reception nodes comprises a remote radio head. The apparatus of The apparatus of paragraph 0052, wherein the plurality of selected sub-bands can span one or more physical resource blocks.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims below.

It is also noted herein that while the above describes example embodiments of the invention, these descriptions should not be viewed in a limiting sense. Rather, there are several variations and modifications which may be made without departing from the scope of the present invention as recited below in the claims.

The invention claimed is:

1. A method comprising:
  receiving signals from a plurality of antennas, the signals being from a plurality of user equipments and comprising a plurality of sub-bands allocated to the plurality of user equipments;
  selecting, based on one or more criteria and for each of the plurality of selected sub-bands allocated to a selected one of the plurality of user equipments, one or more antennas of the plurality of antennas to be used for signal detection and interference suppression on the received signals for the selected user equipment; and
  performing, for the selected user equipment, the signal detection and interference suppression on the received signals for each of the plurality of selected sub-bands based on the corresponding selected one or more antennas for each of the plurality of selected sub-bands to create an output signal by subtracting an interference signal from the received signals.

2. The method of claim 1, wherein:
  the method further comprises estimating channels for the selected user equipment based on each of the plurality of antennas and each of the plurality of selected sub-bands; and
  the one or more criteria comprise the estimated channels for each of the plurality of antennas and for each of the plurality of selected sub-bands.

3. The method of claim 2, wherein:
  the one or more criteria comprise signal strength, determined using the estimated channels, for each of the antennas and each of the plurality of selected sub-bands.

4. The method of claim 2, wherein:
  the one or more criteria comprise one or both of estimated interference or orthogonality between user equipments including the selected user equipment detected in a coordinated multipoint area comprising the plurality of antennas, the one or both of estimated interference or orthogonality determined using the estimated channels and for each of the plurality of antennas and each of the plurality of selected sub-bands.

5. The method of claim 2, wherein performing the signal detection and interference suppression further comprises:
  calculating interference for each of the plurality of selected sub-bands; and
  spatially suppressing the interference based on antenna weights calculated from the calculated interference and corresponding to the selected one or more antennas for each of the plurality of selected sub-bands.

6. The method of claim 5, wherein:
  selecting selects m antennas per sub-band based on the one or more criteria, wherein m is less than all of the plurality of antennas;
  calculating interference further comprises selecting n interferers per selected sub-band, and calculating sub-band-wise interference based on channel estimates corresponding to the m antennas and based on the n strongest interferers; and
  spatially suppressing interference further comprises, using the calculated sub-band-wise interference, calculating and applying antenna-wise weights to the received signals.

7. The method of claim 2, wherein:
  selecting selects m antennas per sub-band based on the one or more criteria, wherein m is less than all of the plurality of antennas;
  performing the signal detection and interference suppression further comprises:
  calculating interference comprises selecting n interferers per selected sub-band, and further comprises determining an interference signal based on channel estimates corresponding to the m antennas and based on the l strongest interferers; and
  subtracting the interference signal from the plurality of received signals to create the output signal.

8. The method of claim 1, wherein:
  each of the plurality of antennas is attached to an individual one of a plurality of reception nodes, and each of the plurality of reception nodes comprises one or more of the plurality of antennas; and
  at least one of the plurality of reception nodes comprises a remote radio head.

9. The method of claim 1, wherein the plurality of selected sub-bands can span one or more physical resource blocks.

10. An apparatus comprising:
  one or more processors; and
  one or more memories including computer program code,
  the one or more memories and the computer program code configured to, with the one or more processors, cause the apparatus to perform at least the following:
  receiving signals from a plurality of antennas, the signals being from a plurality of user equipments and comprising a plurality of sub-bands allocated to the plurality of user equipments;
  selecting, based on one or more criteria and for each of the plurality of selected sub-bands allocated to a selected one of the plurality of user equipments, one or more antennas of the plurality of antennas to be used for signal detection and interference suppression on the received signals for the selected user equipment; and
  performing, for the selected user equipment, the signal detection and interference suppression on the received signals for each of the plurality of selected sub-bands based on the corresponding selected one or more antennas for each of the plurality of selected sub-bands to create an output signal by subtracting an interference signal from the received signals.

11. The apparatus of claim 10, wherein:
  the one or more memories and the computer program code are further configured to, with the one or more processors, cause the apparatus to perform at least the following: estimating channels for the selected user equipment based on each of the plurality of antennas and each of the plurality of selected sub-bands; and the one or more criteria comprise the estimated channels for each of the plurality of antennas and for each of the plurality of selected sub-bands.

12. The apparatus of claim 11, wherein:

the one or more criteria comprise signal strength, determined using the estimated channels, for each of the antennas and each of the plurality of selected sub-bands.

13. The apparatus of claim 11, wherein:

the one or more criteria comprise one or both of estimated interference or orthogonality between user equipments including the selected user equipment detected in a coordinated multipoint area comprising the plurality of antennas, the one or both of estimated interference or orthogonality determined using the estimated channels and for each of the plurality of antennas and each of the plurality of selected sub-bands.

14. The apparatus of claim 11, wherein performing the signal detection and interference suppression further comprises:

calculating interference for each of the plurality of selected sub-bands; and spatially suppressing the interference based on antenna weights calculated from the calculated interference and corresponding to the selected one or more antennas for each of the plurality of selected sub-bands.

15. The apparatus of claim 14, wherein:

selecting selects m antennas per sub-band based on the one or more criteria, wherein m is less than all of the plurality of antennas;

calculating interference further comprises selecting n interferers per selected sub-band, and calculating sub-band-wise interference based on channel estimates corresponding to the m antennas and based on the n strongest interferers; and spatially suppressing interference further comprises, using the calculated sub-band-wise interference, calculating and applying antenna-wise weights to the received signals.

16. The apparatus of claim 11, wherein:

selecting selects m antennas per sub-band based on the one or more criteria, wherein m is less than all of the plurality of antennas;

performing the signal detection and interference suppression further comprises:

calculating interference comprises selecting n interferers per selected sub-band, and further comprises determining an interference signal based on channel estimates corresponding to the m antennas and based on the 1 strongest interferers; and subtracting the interference signal from the plurality of received signals to create the output signal.

17. The apparatus of claim 10, wherein:

each of the plurality of antennas is attached to an individual one of a plurality of reception nodes, and each of the plurality of reception nodes comprises one or more of the plurality of antennas; and at least one of the plurality of reception nodes comprises a remote radio head.

18. The apparatus of claim 10, wherein the plurality of selected sub-bands can span one or more physical resource blocks.

19. The apparatus of claim 11, wherein:

the apparatus further comprises channel estimation circuitry and a receiver comprising baseband circuitry, the channel estimation circuitry separate from the receiver;

the estimating channels is performed by the channel estimation circuitry and estimates of channels are supplied by the channel estimation circuitry to the baseband circuitry in the receiver; and selecting and performing are performed by the baseband circuitry.

20. A computer program product comprising a non-transitory computer-readable storage device bearing computer program code embodied therein for use with a computer, the computer program code comprising:

code for receiving signals from a plurality of antennas, the signals being from a plurality of user equipments and comprising a plurality of sub-bands allocated to the plurality of user equipments;

code for selecting, based on one or more criteria and for each of the plurality of selected sub-bands allocated to a selected one of the plurality of user equipments, one or more antennas of the plurality of antennas to be used for signal detection and interference suppression on the received signals for the selected user equipment; and code for performing, for the selected user equipment, the signal detection and interference suppression on the received signals for each of the plurality of selected sub-bands based on the corresponding selected one or more antennas for each of the plurality of selected sub-bands to create an output signal by subtracting an interference signal from the received signals.

* * * * *